United States Patent
Ootaguro et al.

(10) Patent No.: US 6,778,248 B1
(45) Date of Patent: Aug. 17, 2004

(54) FLAT DISPLAY APPARATUS AND METHOD OF MANUFACTURING THE SAME

(75) Inventors: Hiroshi Ootaguro, Fukaya (JP); Akiko Tanaka, Yokohama (JP); Kazuyoshi Okano, Ibo-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/573,890

(22) Filed: May 19, 2000

(30) Foreign Application Priority Data

May 19, 1999 (JP) .......................................... 11-138510

(51) Int. Cl.$^7$ ............................................ G02F 1/1339
(52) U.S. Cl. ........................ 349/153; 349/155; 349/156
(58) Field of Search ................................ 349/153, 155, 349/156, 158, 190

(56) References Cited

U.S. PATENT DOCUMENTS

| | | | |
|---|---|---|---|
| 5,046,822 A | * 9/1991 | Matsuda et al. ............ | 349/135 |
| 5,552,913 A | * 9/1996 | Shimizu et al. ............. | 349/153 |
| 5,677,749 A | * 10/1997 | Tsubota et al. ............. | 349/160 |
| 6,163,357 A | * 12/2000 | Nakamura ................... | 349/155 |
| 6,226,067 B1 | * 5/2001 | Nishiguchi et al. ......... | 349/155 |
| 6,275,277 B1 | * 8/2001 | Walker et al. ............... | 349/113 |
| 6,384,882 B1 | * 5/2002 | Nagayama et al. ......... | 349/110 |

FOREIGN PATENT DOCUMENTS

| | | | | |
|---|---|---|---|---|
| JP | 62-240931 | * | 10/1987 | ........... G02F/1/133 |
| JP | 01145631 | * | 6/1989 | ........... G02F/1/133 |
| JP | 10-148836 | | 6/1998 | |
| JP | 2000221512 | * | 8/2000 | ......... G02F/1/1339 |

\* cited by examiner

*Primary Examiner*—Robert H. Kim
*Assistant Examiner*—Jeanne Andrea Di Grazio
(74) *Attorney, Agent, or Firm*—Pillsbury Winthrop LLP

(57) ABSTRACT

A flat display apparatus incorporating a first substrate, a second substrate disposed opposite to the first substrate at a position distant from the first substrate for a predetermined distance, a sealing material disposed between the first and second substrates and formed into a frame-like shape to bond the first and second substrates to each other, a light modulation layer held in a gap between the first and second substrates bonded to each other with the sealing material, and spacers secured integrally with at least either of the first and second substrates to maintain the gap, wherein a portion of the spacers is disposed in the sealing-material portion and another portion of the spacers projects from the sealing material.

16 Claims, 6 Drawing Sheets

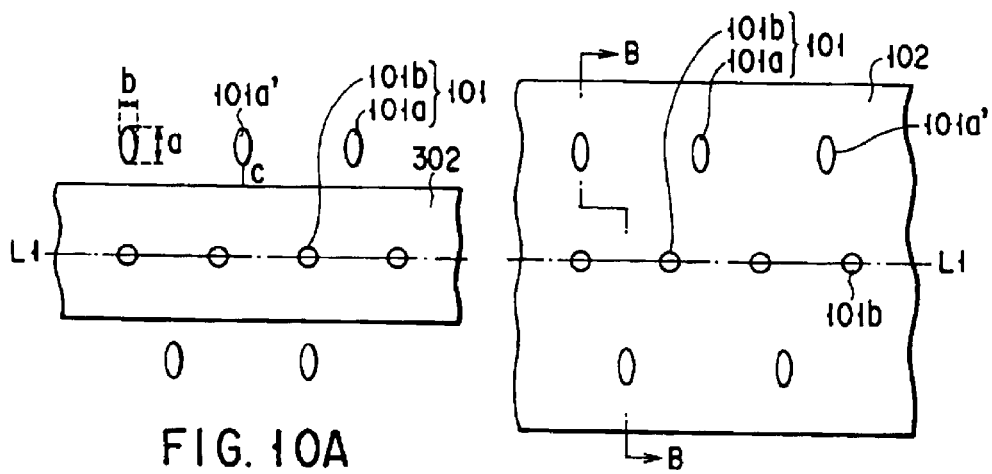
FIG. 10A
FIG. 10B
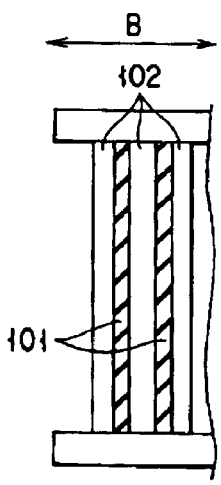
FIG. 10C
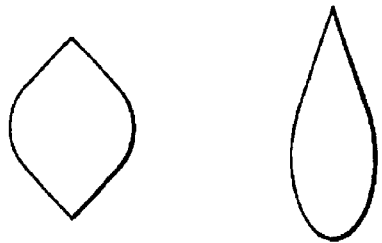
FIG. 11A    FIG. 11B
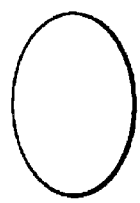    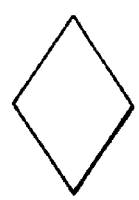        
FIG. 11C    FIG. 11D    FIG. 11E    FIG. 11F

| TEMPERATURE | TIME | DISTANCE FROM ELECTRIC LINE (DISTANCE OBTAINED ON A PHOTOGRAPH) | SPREAD | SPREADING RATE (%/sec) |
|---|---|---|---|---|
| 25 | 0 | 17 | 0% | 0.00 |
| 30 | 95 | 17 | 0% | 0.00 |
| 40 | 152 | 17 | 0% | 0.00 |
| 50 | 211 | 15.5 | 10% | 0.17 |
| 55 | 241 | 13.5 | 23% | 0.44 |
| 60 | 268 | 10.2 | 45% | 0.81 |
| 65 | 300 | 7 | 67% | 0.67 |
| 70 | 333 | 4.8 | 81% | 0.42 |
| 80 | 391 | 3 | 83% | 0.22 |
| 90 | 452 | 2.2 | 99% | 0.09 |
| 100 | 505 | 2 | 100% | 0.02 |
| 110 | 573 | 2 | 100% | 0.00 |

FIG. 15

FLAT DISPLAY APPARATUS AND METHOD OF MANUFACTURING THE SAME

CROSS-REFERENCE TO RELATED APPLICATIONS

This application is based upon and claims the benefit of priority from the prior Japanese Patent Application No. 11-138510, filed May 19, 1999, the entire contents of which are incorporated herein by reference.

BACKGROUND OF THE INVENTION

The present invention relates to a flat display apparatus and a method of manufacturing the same, and more particularly to a flat display apparatus incorporating spacers for maintaining a predetermined distance between substrate thereof and a method of manufacturing the same.

Flat display apparatuses represented by liquid crystal display apparatuses having advantages of small thickness, light weight and small power consumption are widely used in a variety of industrial fields.

For example, an active-matrix liquid crystal display apparatus incorporates an array substrate; a counter substrate disposed opposite to the array substrate; a liquid crystal layer held between a pair of the substrates and serving as a light modulation layer; and a sealing-material portion disposed between the pair of the substrates and formed into a frame-like shape around the light modulation layer.

In order to maintain satisfactory display quality in the flat display apparatus of the foregoing type, a predetermined gap must be maintained between the pair of the substrates. Therefore, an attempt has been made in recent years as disclosed in Jpn. Pat. Appln. KOKAI Publication No. 10-148836 such that spacer is integrally formed with either of the array substrate or the counter substrate. According to the foregoing disclosure, a structure has been disclosed in which the spacer is formed in the sealing-material pattern integrally with the substrate in the sealing-material portion.

FIG. 9 shows a sealing-material portion 202 of a conventional liquid crystal display apparatus and prism-like spacers 201 disposed in the sealing-material portion 202 to maintain a predetermined gap between a pair of substrates.

In a step of applying a sealing material, the prism-like spacers 201 are disposed outside the region which is coated with the sealing material. The sealing material is spread in its widthwise direction owing to the pressure applied in the sealing step. At this time, the prism-like spacers 201 are enclosed by the spread sealing-material portion 202. The spread of the sealing material caused in the sealing step is inhibited by the prism-like spacers 201. Therefore, an air bubble 299 is sometimes formed adjacent to the side wall of the prism-like spacer 201 at a downstream position in the direction in which the sealing material is spread, as shown in FIG. 9. The foregoing air bubble 299 causes the shape of the sealing-material portion 202 to deteriorate. Thus, interruption of the formed seal sometimes occurs.

Specifically, the air bubble 299 formed in the sealing-material portion 202 reduces the width of the sealing-material portion 202, causing the resistance against environment and reliability to deteriorate. When the inside portion of each liquid crystal cell is exhausted to produce a vacuum in the inside portion in a vacuum annealing step or the step of injecting liquid crystal, air in the air bubble 299 is expanded, thus, there is a problem that separation of the seal takes place. In a case where the shape of the sealing-material portion 202 deteriorates, undesired cut surface is formed in a direction of the thickness of the substrate when the substrate is scribed. As a result, there arises a problem in that the manufacturing yield deteriorates.

BRIEF SUMMARY OF THE INVENTION

To overcome the foregoing problems, an object of the present invention is to provide a flat display apparatus incorporating spacers formed integrally with at least either substrate to maintain a predetermined distance between the substrates, capable of preventing formation of an air bubble in a sealing-material portion and excellent in the reliability and manufacturing yield and a method of manufacturing the same.

Another object of the present invention is to provide a flat display apparatus which can quickly be manufactured and a method of manufacturing the same.

According to one aspect of the invention, there is provided a flat display apparatus incorporating a first substrate; a second substrate disposed opposite to and apart from the first substrate for a predetermined gap; a sealing material disposed between the first and second substrates and formed into a frame-like shape to bond the first and second substrates to each other; a light modulation layer held in a gap between the first and second substrates bonded to each other with the sealing material; and spacers secured integrally with at least either of the first and second substrates to maintain the gap, wherein a portion of the spacers is disposed in the sealing material and another portion of the spacers projects from the sealing material.

According to another aspect of the invention, there is provided a method of manufacturing a flat display apparatus incorporating first and second substrates, a light modulation layer disposed between the substrates, a sealing material disposed between the substrates and formed into a frame-like shape enclosing the light modulation layer and spacers provided integrally with the first substrate to maintain a predetermined gap between the first and second substrates, the method of manufacturing a flat display apparatus comprising the steps of: providing the spacers for the first substrate; coating either of the first substrate or the second substrate with a sealing material; overlaying the first and second substrates through the sealing material and the spacers; and pressing the first and second substrates to harden the sealing material to form the sealing-material portion and forming a portion of the spacers in the sealing-material portion and another portion to project from the sealing-material portion.

According to the present invention, a portion of the spacers which is in contact with the sealing-material portion is disposed in the sealing-material portion and the other portion projects from the sealing-material portion. Therefore, formation of an air bubble in the sealing-material portion can considerably be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are schematic plan views each showing region C shown in FIG. 1, in which FIG. 3A is a diagram showing the positional relationship between the applied sealing material and a spacer and FIG. 3B is a diagram showing the positional relationship between the hardened sealing material and the spacer;

FIGS. 10A to 10C are diagrams showing the positional relationship between a sealing material and spacers according to another embodiment of the present invention, in which FIG. 10A is a diagram showing the positional relationship between the applied sealing material and the spacers, FIG. 10B is a diagram showing the positional relationship between the hardened sealing material and the spacers and FIG. 10C is a cross sectional view taken along the line B—B shown in FIG. 10B.

FIGS. 11A to 11F are diagrams showing cross sectional shapes obtained by cutting columnar spacers according to another embodiment of the invention in parallel with the substrate;

FIGS. 12A and 12B are diagrams showing the positional relationship between a sealing material and spacers according to another embodiment of the invention, in which FIG. 12A is a diagram showing the positional relationship between the applied sealing material and spacers and FIG. 12B is a diagram showing the positional relationship between the hardened sealing material and the spacers;

FIG. 15 is a graph showing the characteristics of the sealing material according to the invention.

DETAILED DESCRIPTION OF THE INVENTION

Figure 1:
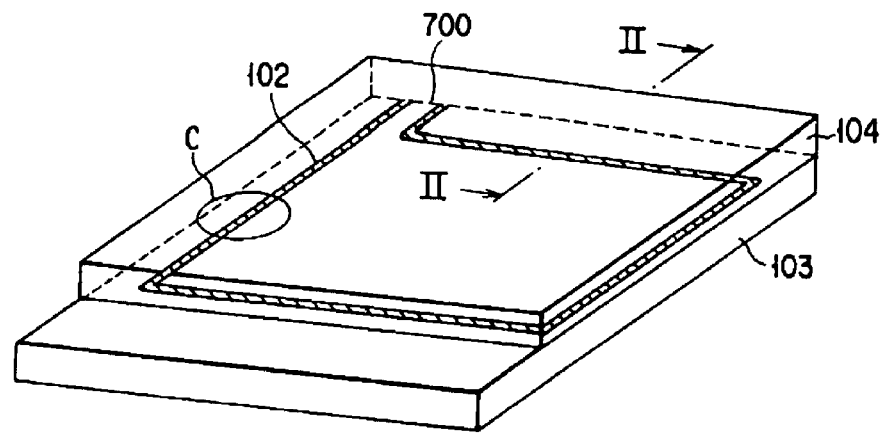
FIG. 1 is a schematic perspective view showing a flat display apparatus according to an embodiment of the invention.

Referring to the drawings, embodiments of a flat display apparatus and a method of manufacturing the same according to the present invention will now be described.

Figure 2:
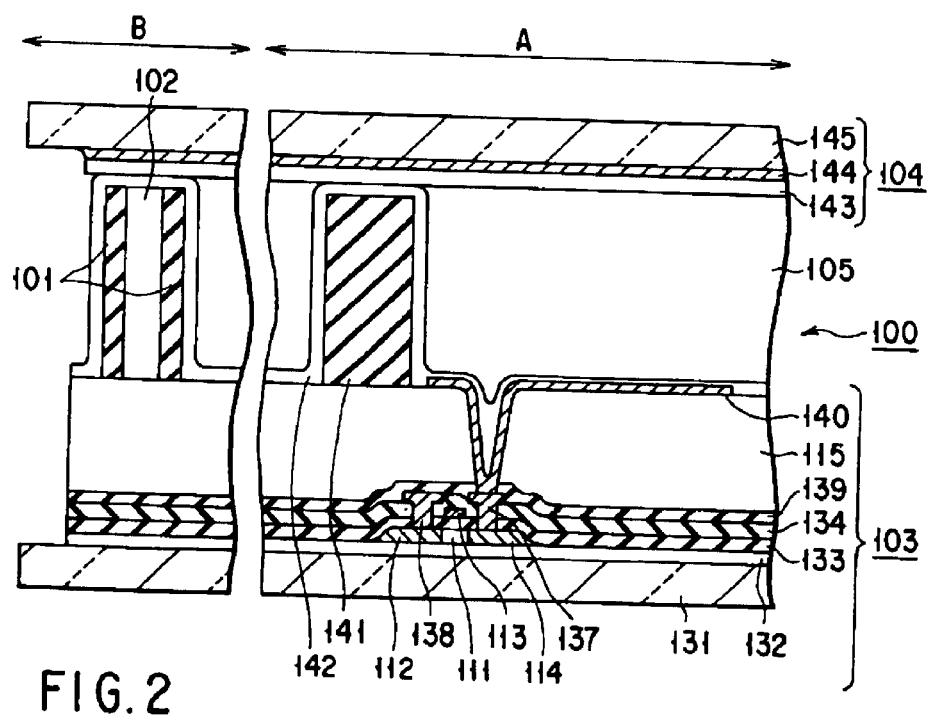
FIG. 2 is a partially schematic cross sectional view taken along the line II—II shown in FIG. 1.

As shown in FIG. 2, a liquid crystal display apparatus 100 according to this embodiment incorporates an array substrate 103, a counter substrate 104, a liquid crystal layer 105 constituted by twisted-nematic liquid crystal; and spacers 101 and 141. The liquid crystal layer 105 is held between the array substrate 103 and the counter substrate 104 via alignment films 142 and 143. The spacers 101 and 141 are formed integrally with the upper surface of the array substrate 103 to maintain a predetermined distance of, for example, 5.2 μm, between the two substrates 103 and 104. As shown in FIGS. 1 and 2, the two substrates 103 and 104 are hermetically joined to each other with a sealing-material portion 102 formed into a rectangular shape enclosing a display region. FIG. 2 shows the cross section of a display region A and the cross section of a proximity portion B of the sealing material portion 102. The cross sectional view of the proximity portion B of the sealing material portion 102 corresponds to the cross sectional view taken along the line B—B shown in FIG. 3B.

The array substrate 103 is constituted by signal lines 138, disposed substantially in parallel to each other and at regular intervals; scanning lines, through an interlayer insulating film 134, disposed substantially perpendicular to the signal lines 138 and which are electrically isolated for signal lines by the interlayer insulating film 134; thin film transistors, that is TFT (Thin Film Transistor), disposed at intersections between the signal lines 138 and the scanning lines; and pixel electrodes 140 connected to the TFT are arranged on a transparent substrate 131.

That is, the coplanar polysilicon TFT is, as shown in FIG. 2, constituted by a polysilicon layer, via an under coat layer 132, formed on the transparent substrate 131 constituted by glass and including channel region 111, source region 114 and drain region 112; a gate insulating film 133 formed to cover the polysilicon layer; and a gate electrode 113 formed on the gate insulating film 133. The source electrode 137 is electrically connected to the source region 114 through a contact hole formed in the gate insulating film 133 and the interlayer insulating film 134. The drain electrode formed integrally with the signal line 138 is electrically connected to the drain region 112 through a contact hole formed in the gate insulating film 133 and the interlayer insulating film 134.

Red (R), green (G) and blue (B) coloring layers 115 are formed through an insulating layer 139 formed on the interlayer insulating film 134. Pixel electrodes 140 constituted by ITO (Indium Tin Oxide) are disposed on the coloring layers 115. The pixel electrodes 140 are connected to the source electrodes 137 through contact holes formed in the insulating layer 139 and the coloring layers 115.

Columnar spacers 141 are disposed in a region between the pixel electrodes 140 formed on the coloring layers 115 in the display region A. The columnar spacers 101 are disposed in a proximity portion B to the sealing material portion 102. An alignment film 142 is provided for the overall surface of the substrate to cover the columnar spacers 141 and 101, the pixel electrodes 140 and the coloring layers 115.

The counter substrate 104 disposed opposite to the array substrate 103 is constituted by counter electrodes 144 provided for the transparent substrate 145 and an alignment film 143 disposed to cover the counter electrodes 144.

The structure of the proximity portion B to the sealing material portion 102 will now be described.

As shown in FIG. 2, the under coat layer 132 on the transparent substrate 131, the gate insulating film 133, the interlayer insulating film 134, the insulating layer 139, the coloring layers 115 and the alignment film 142 extend to an end of the substrate at which the sealing-material portion 102 is formed. The columnar spacers 101 in the proximity portion B of the sealing material portion 102 are formed by a step which is the same as the step of forming the columnar spacers 141 in the display region A. The columnar spacers 101 are disposed in the sealing-material portion 102. The columnar spacers 101 are disposed at substantially the same intervals along a seal pattern formed into a frame shape, as shown in FIG. 1.

Figures 3A, 3B:
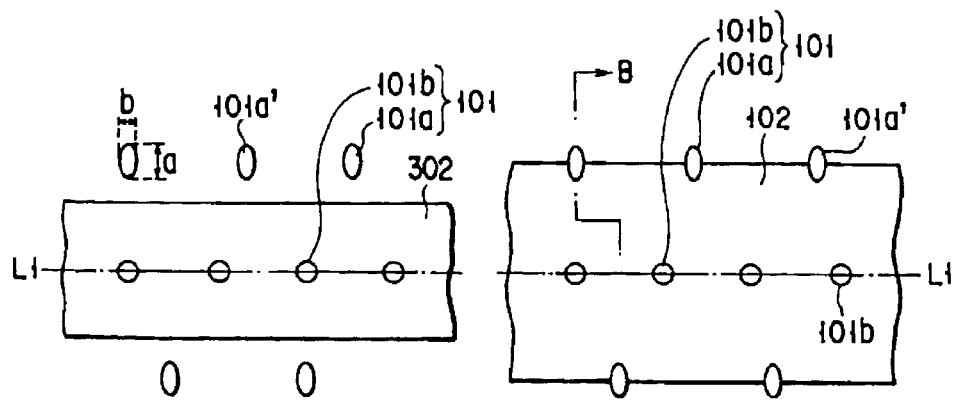

Specifically, as shown in FIG. 3B, the columnar spacers 101 disposed in contact with the sealing-material portion 102 are constituted by a plurality of cylindrical first spacers 101b disposed along a parting line L1 of the sealing-material portion 102; and a plurality of second spacers 101a disposed apart from the parting line L1 and formed on the two sides of the parting line L1 to form a zigzag configuration. The second spacer 101a has a substantially streamline cross sectional shape in a plane which is in parallel with the substrate.

As shown in FIG. 3A, the first spacer 101b is disposed at a position which is enclosed by the sealing material 302 in a step of coating the sealing material. The second spacer 110a is disposed at a position apart from the sealing material 302 in a step of coating the sealing material. When the second spacer 101a is cut with a plane which is in parallel with the substrate, the length a of the second spacer 101a in the widthwise direction of the seal is longer than the length b in a direction perpendicular to the widthwise direction. For example, the second spacer 101a is formed into a columnar shape having an elliptic cross sectional shape having a major axis a of 100 μm, a minor axis b of 50 μm and a height of 5.2 μm. The distance between the adjacent second spacers 101a and 101a' is 4 mm. The reason for this will now be described. In a case where the second spacers are distant from each other for 6 mm or longer, the constant distance cannot be obtained between the substrates. The first spacer 101b is formed into a cylindrical shape having a circular section, the diameter of which is 50 μm, and the height of which is 5.2 μm.

In the coating step, the sealing material 302 is disposed to enclose the first spacers 101b at a position distant from the second spacers 101a. Then, a sealing step is performed to seal the two substrates. As shown in FIGS. 3A and 3B, the sealing material is applied with pressure so that the sealing-material portion 302 is spread in the widthwise direction. Since the sealing-material portion 302 is spread and formed the sealing-material portion 102, a portion of the second spacers 101a is, as shown in FIG. 3B, enclosed by the sealing-material portion 102 after the sealing material has been hardened. Moreover, the remaining portion, that is, the other portion of the second spacer 101a, projects from the sealing-material portion 102. It is preferable that the length of the portion of the second spacer 101a disposed in the sealing-material portion 102 in the direction of the major axis is shorter than ⅓ of the width of the sealing-material portion 102 after the sealing material has been hardened.

It is preferable that each of the second spacers 101a have the above-mentioned streamline shape. Note that another shape, for example, a cylindrical shape or a prism shape, which does not inhibit spreading of the spread of the sealing material 302 may be employed.

Figure 6A:
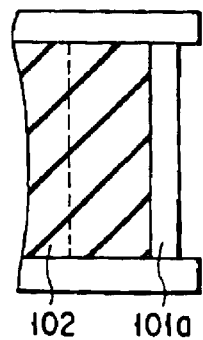
FIGS. 6A to 6C are schematic cross sectional views showing the positional relationship between the hardened sealing material and the spacer.
Figure 6B:
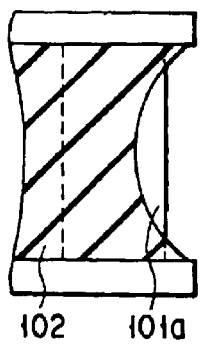
Figure 6C:
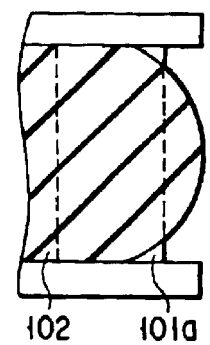

FIGS. 6A to 6C are schematic cross sectional views showing the positional relationship between the second spacer 101a and the sealing-material portion 102 realized after the sealing material has been hardened. As shown in FIG. 6A, it is preferable that a portion of the second spacer 101a projects from the sealing-material portion 102 in all of cross sections which are in parallel with the substrate. Note that a portion of the second spacer 101a may project from the sealing-material portion 102 in a portion of the cross sections, as shown in FIGS. 6B and 6C.

Figure 7:
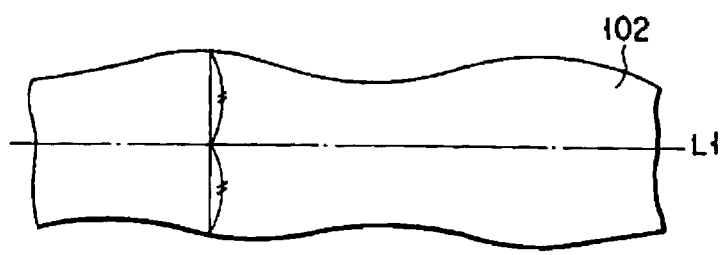
FIG. 7 is an enlarged plan view showing the sealing material provided for the substrate.

Referring to FIG. 7, the parting line will now be described which is formed in a direction of substantially the widthwise directional centers of the sealing-material portion 102. As shown in FIG. 7, the hardened sealing-material portion 102 after it has been applied to the substrate spreads in such a manner that small concave portions and projections are formed at two widthwise ends. An assumption is made that a set of substantial centers of the sealing-material portion 102 in the widthwise direction is L1. The set L1 is called the parting line formed in the direction of the substantial centers of the sealing-material portion 102 in the widthwise direction.

Figure 8A:
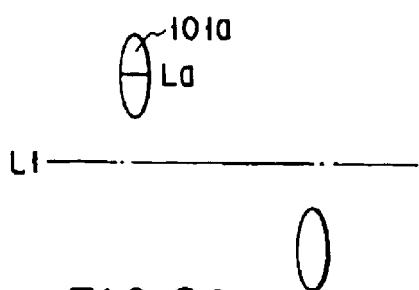
FIGS. 8A and 8B are diagrams showing the positional relationship between the parting line of the sealing material and the columnar spacers according to another embodiment of the invention.
Figure 8B:
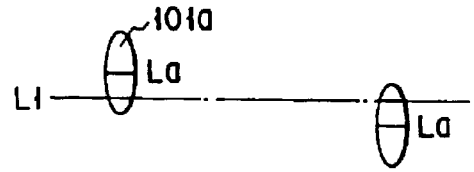
Figure 9:
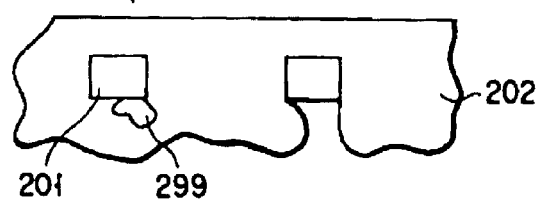
FIG. 9 is a diagram showing conventional prismlike spacers and a sealing material.

In this embodiment, the second spacers 101a are disposed at the positions on the two sides of the parting line L1 such that the second spacers 101a are distant from the parting line L1 after the sealing material has been hardened. As shown in FIG. 8A, the second spacers 101a may be disposed apart from the parting line L1 for a predetermined distance. As shown in FIG. 8B, the ends of the second spacers 101a may overlap the parting line L1. That is, the following structure is required in which line segments La each bisectioning the major axis of each second spacer 101a are disposed on the two sides across the parting line L1 of the sealing material portion such that the line segments La do not coincide with the parting lines L1.

As described above, the liquid crystal display apparatus according to this embodiment has the structure that the spacers integrated with the array substrate and formed in the sealing region are disposed in the same step of disposing the spacers in the display region. Thus, the distance between the substrates can be maintained to satisfy a predetermined range. Therefore, satisfactory quality of display can be maintained. The spacers disposed in the sealing region includes spacers, a portion of each of which projects from the sealing material portion. Therefore, formation of undesired air bubbles in the sealing material portion can be prevented causing a predetermined width of sealing to be maintained. As a result, the manufacturing yield can be improved and excellent reliability can be maintained for a long time.

In this embodiment, the spacers which are in contact with the sealing material include the first spacers disposed on the parting lines of the sealing material portion and the second spacers each having a portion projecting from the sealing material portion. Therefore, excellent in-plane uniformity of the distances between the substrates can be realized.

Although the spacers are disposed integrally with the upper surface of the array substrate in this embodiment, the spacers may be disposed integrally with the upper surface of the counter substrate. A portion of the spacers may be disposed on the array substrate and another portion of the same may be disposed on the w counter substrate.

A method of manufacturing the liquid crystal display apparatus 100 will now be described.

The array substrate 103 is manufactured, for example, as follows.

A two-layer film composed of a silicon oxide film and a silicon nitride film and serving as the under coat layer 132 is formed on the transparent substrate 131 comprising glass or the like by a normal-pressure CVD or plasma CVD. Then, a similar step is performed so that an amorphous silicon film is formed on the under coat layer 132 to have a thickness of 100 nm. Then, an annealing step is performed such that the amorphous silicon layer is irradiated with excimer laser beam. Thus, the amorphous silicon layer is converted into a polycrystal structure so that the polysilicon layer is formed.

Then, a step of patterning the polysilicon is performed so that the polysilicon layers are formed into a required shape. Then, silicon oxide Siox is deposited on the overall surface of the polysilicon layer to cover the same by the CVD method so that the gate insulating film 133 is formed. Then, a metal gate film is deposited on the gate insulating film 133, and then the photolithography technique is employed to perform a patterning step so that the gate electrodes 113 are formed.

Then, the gate electrodes 113 are used as a mask for use in a step of doping phosphorus ions ($P^+$) into the polysilicon layers. Thus, the source regions 114 and the drain regions 112 are formed on the polysilicon layers. The regions sandwiched between the source and drain regions 114 and 112 serve as the channel regions 111.

Then, the CVD method or the like is employed to deposit silicon oxide SiOx serving as the interlayer insulating film 134 to cover the overall surface of the substrate. Then, contact holes penetrating the interlayer insulating film 134 and the gate insulating film 133 to reach the drain regions 112 and the source regions 114 are formed. Then, a metal film is formed, and then a patterning step is performed so that signal lines 138 integrated with the drain electrode which are in contact with the drain regions 112 are formed. Moreover, source electrodes 137 which are in contact with the source regions 114 are formed.

Then, the CVD method is employed to form the insulating layer 139 having the two-layer structure composed of silicon oxide Siox and silicon nitride SiNx is formed on the overall surface of the substrate. Then, the green coloring layers 115 are formed into a predetermined pattern by performing exposure, development, and baking. Similarly, the blue and red coloring layers 115 are sequentially formed.

Then, a spinner is operated to coat each coloring layer 115 with black resist, and then a drying step is performed at 80° C. for 2 minutes. Then, a predetermined photomask is used to perform an exposing step under conditions that the wavelength is 365 nm and an amount of exposure is 250 mJ/cm². Then, the black resist is developed with TMAH (Tri Methyl Ammonium Hydride) solution, the pH of which is 11.7, for 60 seconds.

Then, a baking step is performed at 220° C. for 60 minutes. Thus, spacers 141 and 101 each having a thickness of 5.2 µm are formed in the display region A and proximity portion B of the sealing material portion.

Then, openings which reach the source electrodes 137 are formed in the coloring layers 115 and the insulating layer 139. Then, the ITO film is formed, and then patterning of the ITO film is performed. Thus, pixel electrodes 140 connected to the source electrodes 137 through the openings are formed. Then, an alignment film 142 is formed on the overall surface of the substrate to cover the columnar spacers 141 and 101, the pixel electrodes 140 and the coloring layers 115.

Thus, the array substrate 103 is manufactured.

On the other hand, the counter substrate 104 is manufactured by sequentially forming the counter electrode 144 and the alignment film 143 on the transparent substrate 145 constituted by glass or the like.

Then, as shown in FIG. 1, a thermosetting sealing material is disposed to the array substrate 103 by using a dispenser or a mask pattern. At this time, the width of the applied sealing material is about 350 mm to about 400 mm. One opening serving as an injection hole for liquid crystal in the following step is formed. The sealing material is disposed into frame shape, which is a rectangular shape in this embodiment, along the outer periphery of the display region.

Then, the array substrate 103 and the counter substrate 104 are hermetically laminated such that their surfaces having the electrodes oppose each other via the frame-shape sealing material applied along the outer periphery of the display region. Thus, the array substrate 103 and the counter substrate 104 are hermetically bonded to each other. The distance between the array substrate 103 and the counter substrate 104 is 5.2 µm owing to the spacers.

The sealing material is applied by an air pressure applying method.

Figure 4:
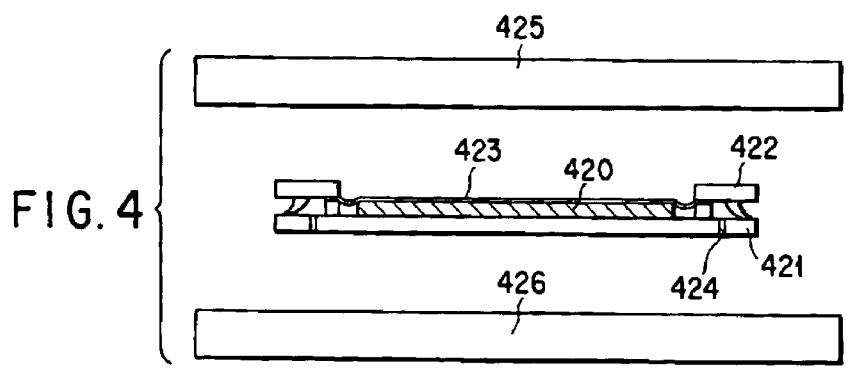
FIG. 4 is a schematic cross sectional view showing an air pressure sealing apparatus by air pressure method.

As shown in FIG. 4, a vacuum-pressure applying sealing apparatus incorporates a tray 421 arranged between an upper IR heater 425 and a lower IR heater 426, and a pressing sheet 423. Cell 420, formed by laminating the array substrate and the counter substrate through the sealing material, is placed on the tray 421. The pressing sheet 423 covers the overall body of the cell 420 placed on the tray 421 and presses the cell 420 by sucking air between the pressing sheet 423 and the tray 421. The upper and lower IR heaters heat the cell 420 and harden the sealing material.

The above-mentioned sealing apparatus is operated such that the cell 420 is placed on the tray 421 and positioning is performed. Then, the cell 420 is coated with the pressing sheet 423, and then the pressing sheet 423 is secured by using the sheet frame 422. Then, a vacuum sucking apparatus is driven to suck air through a vacuum suction opening 424 so as to suck air between the tray 421 and the pressing sheet 423. Thus, air is uniformly sucked to the overall surface of the cell 420 so that the cell 420 is uniformly applied with pressure.

In a state where the cell 420 is applied with the pressure, temperature is rising using the upper IR heater 425 and the lower IR heater 426. Thus, the sealing material is hardened. The heating operation using the upper and lower IR heaters 425 and 426 is performed gradually. The heating operation is performed to raise the temperature from 25° C. which is the room temperature, to 160° C. at a high temperature rising rate of 9.6° C./min which is not lower than 3.0° C./min. Then, the temperature of 160° C. is maintained. Thus, the heating operation is performed for 23 minutes so that the sealing material is uniformly hardened and the sealing operation is completed.

Figure 5:
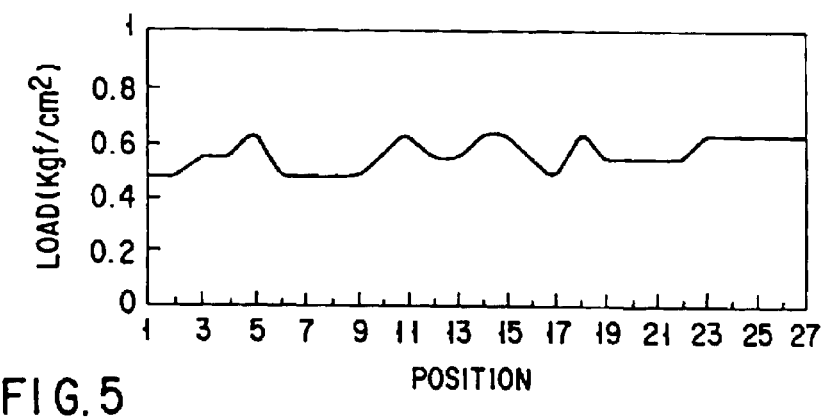
FIG. 5 is a graph having an axis of ordinate standing for the applied pressure and an axis of abscissa standing for the in-plane position of the substrate to illustrate pressure distribution over the substrate caused by the air pressure method.

FIG. 5 is a graph showing the distribution of pressures applied to the cell 420 sealed with air pressure. The cell 420 is accurately and substantially uniformly pressurized with a pressure of 0.4 to 0.6 kgf/cm² applied to the overall surface of the substrate.

Then, the cell is introduced into a vacuum chamber, and then the pressure in the cell is reduced. Then, twisted-nematic liquid crystal is injected through an injection hole 700, and then the injection hole 700 is closed with a closing material, Thus, the liquid crystal display apparatus is manufactured.

The thus-manufactured liquid crystal display apparatus was free from formation of air bubbles at a position adjacent to the spacers in the sealing material portion.

When ultraviolet-ray-setting adhesive agent is employed as the sealing material, the sealing material can be hardened with ultraviolet rays applied while pressure is being applied.

In the foregoing embodiment, the first spacers enclosed by the sealing material portion are disposed on the parting line of the sealing material. The first spacers may be included spacers enclosed by the sealing material portion and disposed apart from the parting line. Also in the foregoing case, formation of an air bubble can be prevented by providing the second spacer having the portion disposed in the sealing material portion and the other portion which projects from the sealing material portion. When the spacer enclosed by the sealing material portion at the position apart from the parting line has the streamline cross sectional shape and the length in the longitudinal direction and the length in the widthwise direction substantially coincide with each other, formation of the air bubbles can furthermore be prevented.

Before the cell is applied with the pressure, when the columnar spacers are disposed such that the contact with the sealing material is inhibited or when the columnar spacers are disposed to be in portiol contact with the sealing material, a structure that a portion of the second spacers are disposed to project from the sealing material portion enables formation of the air bubble to be prevented.

The structure of a portion adjacent to the sealing material according to another embodiment of the invention will now be described.

As shown in FIGS. 10A to 10C, columnar spacers 101 are disposed along a rectangular configuration of the sealing material in the region in which the sealing material is formed. That is, as shown in FIG. 10B, the columnar spacers 101 which are in contact with a sealing material portion 102 are composed of spacers 101a disposed apart from a parting line L1 and spacers 101b disposed along the parting line L1. The columnar spacers 101 are secured to the array substrate 103.

The positional relationship between the columnar spacers 101, which are disposed adjacent to the sealing material, and the sealing material will now be described. As shown in FIG. 10A, the spacers 101a are, in the portion on the outside of the region which is coated with the sealing material, disposed on the two sides of a sealing material 302. The cylindrical spacers 101b are disposed in the region which is coated with the sealing material. Each of the columnar spacers 101a has length a in the widthwise direction of the sealing material which is longer than length b in a direction perpendicular to the widthwise direction. Moreover, each columnar spacer 101a has a streamline cross sectional shape when the spacer 101a is cut with a plane which is in parallel with the substrate. For example, each of the columnar spacers 101a is formed into a columnar shape having an elliptic cross section, the major axis a of which is 100 μm, a minor axis b hi; of which is 50 μm and a height of which is 5.2 μm. Each of the spacer 101b is formed into a cylindrical shape having a circular cross section, the diameter of UA which is 50 μm and a height of which is 5.2 μm.

Since the sealing material is spread in the step of sealing the substrates, the columnar spacers 101a are completely enclosed by the sealing-material portion 102, as shown in FIGS. 10B and 10C. Therefore, the columnar spacers 101a are present in the sealing-material portion 102 after the sealing material has been hardened.

Each of the columnar spacers 101a has a cross section which is obtained by cutting each of the columnar spacers 101a with a plane which is in parallel with the substrate and which is formed into the streamline shape so that spread of the sealing material 302 is not inhibited. That is, the sealing material 302 is spread in its widthwise direction. Since the columnar spacers 101a do not inhibit the spread of the sealing material 302, the columnar spacers 101a are disposed such that the longitudinal direction of the cross section of each of the columnar spacers 101a is in parallel with the direction of spreading of the sealing material 302. Namely, the longitudinal direction of each of the columnar spacers 101a and a direction in which one of the sides of the sealing material 302 nearest to the columnar spacer 101a extends have substantially the perpendicular relationship. Note that the cross section of each of the columnar spacers 101a is not required to have the constant area.

In the step of coating the sealing material, the columnar spacers 101a are disposed apart from the sealing material 302 which is applied and have distance which is 40 to 50 μm. The columnar spacers 101a are disposed such that the longitudinal direction of its cross section and a direction in which one of the sides of the sealing material 302 extends have the perpendicular relationship. That is, the longitudinal direction of the spacer and the widthwise direction of the sealing material are substantially in parallel with each other.

It is preferable that the adjacent columnar spacers 101a and 101a' are apart from each other for a distance of 6 mm or shorter. In a case where the columnar spacers are distant from each other for 6 mm or longer, there is a problem that the constant distance between the substrates cannot be realized. Since the columnar spacers 101a are important elements to maintain a required distance between the substrates in the sealing portion, the columnar spacers 101a are disposed in both regions when the region in which the sealing material is formed is bisectioned into two regions with a parting line L1 which bisections the region in which the sealing material is formed. The columnar spacers 101a are disposed on the two sides of the region in which the sealing material is applied in the step for applying the sealing material. As shown in FIG. 10B, the columnar spacers 101a are disposed on the two sides of the region which is coated with the sealing material such that the columnar spacers 101a form a zigzag configuration. Therefore, the cell obtained by bonding the counter substrate can be brought to a state where uniform distance between the substrates can be maintained adjacent to the region in which the sealing material is formed.

In this embodiment, the columnar spacers are fixedly disposed on the parting line L1 of the region in which the sealing material is formed and on the two sides of the parting line L1. Therefore, the columnar spacers can uniformly be disposed in the region in which the sealing material is formed so that the uniform distance of the sealing material is maintained between the substrates.

The shape of the columnar spacer is not limited to the foregoing shape. The necessity lies in that the shape does not inhibit the spread of the sealing material when the operation using the sealing material is performed. The material and the structure of the columnar spacer are not limited to those according to the foregoing embodiment.

FIGS. 11A to 11F show cross sectional shapes of the columnar spacer according to the present invention and obtained in parallel with the substrate.

FIG. 11C shows an elliptic shape according to the foregoing embodiment. Moreover, streamline shapes as shown in FIGS. 11A and 11B, a rectangular shape as shown in FIG. 11D and a polygonal shape such as a hexagonal shape as shown in FIG. 11E, may be employed. A streamline shape formed by combining a rectangle and a semi-circle as shown in FIG. 11F may be employed. In any case, the cross sectional shape is formed such that the length of the seal in its widthwise direction is longer than the length in the direction perpendicular to the widthwise direction of the same. That is, the columnar spacer is formed into a shape that the longitudinal direction of the spacer is substantially in parallel with the direction in which the sealing material is spread in order to prevent a fact that the spread of the sealing material is inhibited by the columnar spacer when the sealing material is spread owing to the sealing operation.

As described above, the longitudinal direction of the cross section of the columnar spacer and the direction in which one of the sides of the sealing material nearest to the columnar spacer extends have substantially the perpendicular relationship. Moreover, the longitudinal direction of the columnar spacer and the direction in which the sealing material is spread have substantially the parallel relationship. Therefore, formation of an air bubble in a region adjacent to the columnar spacer completely enclosed by the sealing material can be prevented. Since the direction in which the sealing material is spread and the longitudinal direction of the streamline spacer coincide with each other, the liquid crystal display apparatus incorporating the sealing material free from any air bubble can be obtained.

Another embodiment of the present invention will now be described.

Figure 12A:
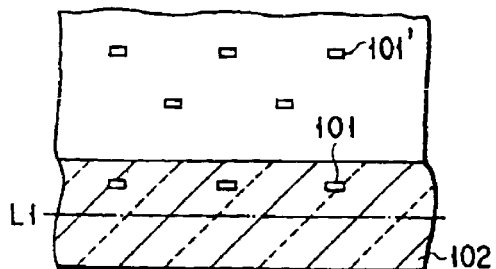
Figure 12B:
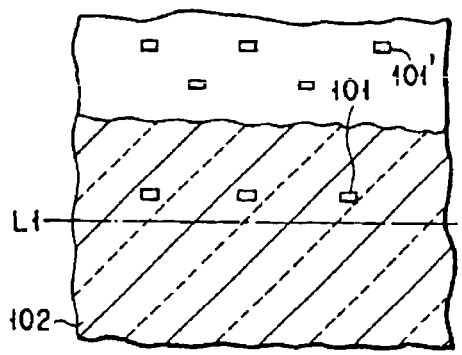

In the foregoing embodiment, the columnar spacers disposed in the region in which the sealing material is applied are disposed on the parting line L1. The columnar spacers may be disposed apart from the parting line L1. That is, as shown in FIG. 12A, the columnar spacers 101 must previously be disposed at positions at which the columnar spacers 101 are completely enclosed by the applied sealing material. The thus-disposed columnar spacers 101 are free from formation of any air bubble even after the sealing-material portion 102 has been pressed and spread as shown in FIG. 12B. Thus, a substantially uniform width of sealing can be realized.

Furthermore, columnar spacers 101' may be provided outside the region in which the sealing material is applied. Thus, they do not contact the sealing material. As a result, in the step of disposing the sealing material and the step of hardening the sealing material, air bubbles do not generate. In such a manner, the spacers 101 are provided in the sealing material and the spacers 101' are provided outside the above region, thus achieving a liquid crystal display apparatus wherein the distance between the substrates is kept constant.

The thermosetting epoxy adhesive agent serving as the sealing material in the foregoing embodiments has the following characteristics.

Figure 13:
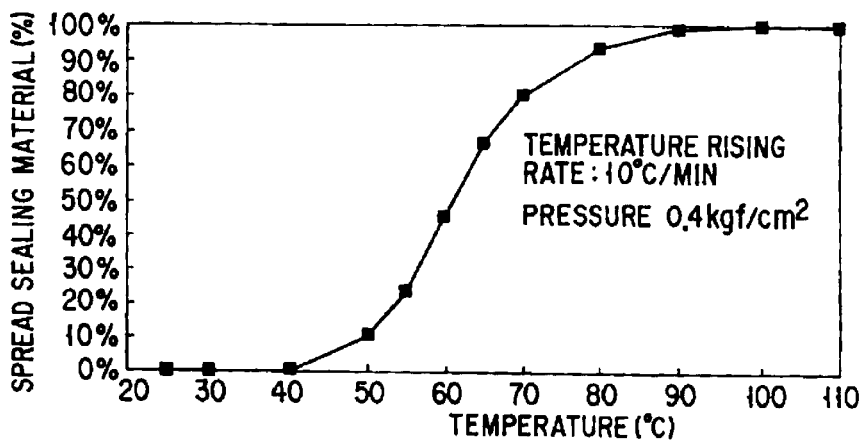
FIG. 13 is a graph showing a characteristic of spread of the sealing material according to the invention with respect to the temperatures.
Figure 14:
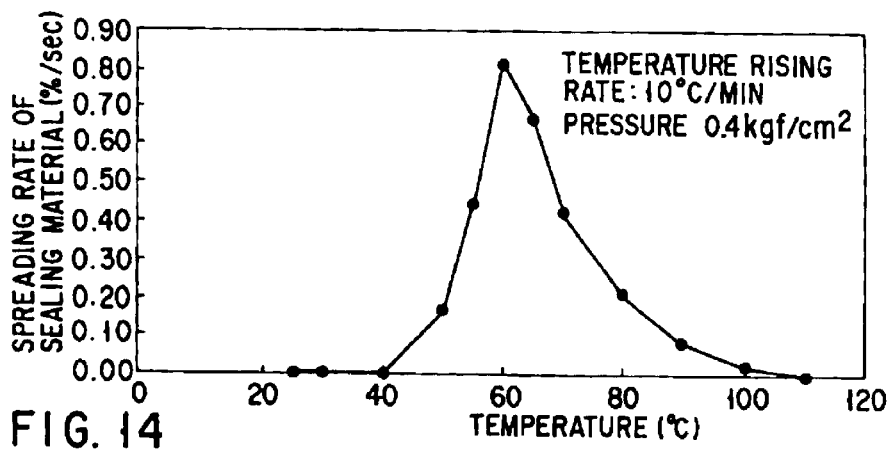
FIG. 14 is a graph showing a characteristic of the spreading rate of the sealing material according to the invention with respect to the temperatures.

The sealing material has temperature characteristics as shown in FIGS. 13 to 15. That is, when the sealing material is, under a pressure of 0.4 kgf/cm², heated at a temperature rising rate of 10° C./min, the spreading rate is 17%/sec or lower until the temperature is 50° C. or lower. When the temperature is 55° C. to 70° C. the spreading rate is 0.42%/sec to 0.81%/sec.

The liquid crystal display apparatus incorporating the polysilicon layer serving as the TFT semiconductor layer permits a structure to be employed in which the driving circuit is simultaneously formed with the substrate on which the TFT is formed. The liquid crystal display apparatus integrally incorporating the driving circuit is sometimes structured such that the sealing-material portion and the driving circuit overlap in order to enlarge the effective display region of the substrate. Usually, the sealing material contains fibers to maintain a required distance between the two substrates.

Therefore, there is a problem that the fiber breaks the driving circuit in a case of a structure in which the sealing material and the driving circuit overlap. Therefore, it is preferable that a sealing material which does not contain the fiber is employed. When a sealing material of the foregoing type is employed, spacers must be disposed adjacent to the sealing-material portion. Therefore, it is effective that the present invention is applied to the positional relationship between the spacers adjacent to the sealing-material portion and the sealing-material portion.

In the foregoing embodiments, the columnar spacers are fixed to the upper surface of the array substrate. Moreover, the array substrate is coated with the sealing material. The necessity for the columnar spacer to be disposed on the substrate which is coated with the sealing material can be eliminated. For example, the columnar spacers may be disposed on either substrate and the other substrate is coated with the sealing material.

In the foregoing embodiments, the liquid crystal display apparatus incorporates the pixel electrodes formed on the array substrate; and the opposite electrodes formed on the opposite substrate. The present invention may be applied to a liquid crystal display apparatus, such as the IPS (In Plane Switching) mode apparatus in which the opposite electrodes and pixel electrodes are provided for either substrate as a displaying electrode pattern.

The foregoing embodiment has been explained by referring to the liquid crystal display apparatus using liquid crystal as a light modulation layer. However, the embodiment is not limited to such a liquid crystal display apparatus. For example, an EL (electro luminescence) display apparatus in which a luminous layer such as a phosphor is provided in the light modulation layer may be adopted as the flat display apparatus according to the embodiment.

The flat display apparatus and the method of manufacturing the same according to the present invention have the structure that the spacers are integrally formed on at least either substrate. Therefore, a uniform distance can be maintained between the substrates. Moreover, formation of an air bubble in the sealing-material portion can be prevented. As a result, a flat display apparatus excellent in the reliability and manufacturing yield can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat display apparatus comprising:

a first substrate;

a second substrate disposed opposite to and apart from the first substrate for a predetermined distance;

a sealing material disposed between the first and second substrates and formed into a frame-like shape to bond the first and second substrates to each other;

a light modulation layer held in a gap between the first and second substrates bonded to each other with the sealing material; and columnar patterned spacers secured integrally with at least either of the first and second substrates to maintain the gap, the spacers being formed of a different material from the sealing material;

wherein the spacers are disposed apart from and across a parting line which is formed along substantial centers of the sealing material in the widthwise direction of the sealing material, and wherein a portion of each of the spacers is disposed in the sealing material and other portion of the spacers projects from the sealing material.

2. A flat display apparatus according to claim 1, wherein the spacers include the other portion projecting from the sealing material in all of cross sections which are in parallel with the first and second substrates.

3. A flat display apparatus according to claim 2, wherein the spacers are disposed on the two sides of the parting line which is formed along substantial centers of the sealing material in the widthwise direction of the sealing material.

4. A flat display apparatus according to claim 3, wherein the spacers are disposed in a zigzag configuration with respect to the parting line.

5. A flat display apparatus according to claim 1, wherein each of the spacers has a streamline cross sectional shape when the spacer is cut with a plane which is in parallel with the first substrate or the second substrate.

6. A flat display apparatus according to claim 1, wherein each of the spacers has a streamline cross sectional shape when the spacer is cut with a plane which is in parallel with the first substrate or the second substrate, and the longitudinal direction of the cross section and the widthwise direction of the sealing material substantially coincide with each other.

7. A flat display apparatus according to claim 1, wherein the flat display apparatus does not include the other spacers which are disposed apart from the parting line formed along substantial centers of the sealing material in the widthwise direction of the sealing material and which are enclosed by the sealing material.

8. A flat display apparatus according to claim 1, wherein the flat display includes the other spacers disposed apart from the parting line which is formed along substantial centers of the sealing material in the widthwise direction of the sealing material and enclosed by the sealing material, each of the other spacers has a streamline cross section when the spacer is cut with a plane which is in parallel with the first and second substrates and the longitudinal direction of the cross section shape and the widthwise direction of the sealing material substantially coincide with the other.

9. A flat display apparatus according to claim 1, wherein the flat display apparatus includes other spacers enclosed by the sealing material and disposed on a parting line formed along substantial centers of the sealing material in the widthwise direction of the sealing material.

10. A method of manufacturing a flat display apparatus incorporating first and second substrates, a light modulation layer disposed between the substrates, a sealing material disposed between the substrates and formed into a frame-like shape enclosing the light modulation layer and spacers provided integrally with the first substrate to maintain a predetermined distance between the first and second substrates, the method of manufacturing a flat display apparatus comprising the steps of:

providing columnar patterned spacers for the first substrate;

coating a sealing material on either of the first substrate or the second substrate;

positioning the spacers apart from the sealing material after coating the sealing material;

overlaying the first and second substrates through the sealing material and the spacers; and applying pressure to the first and second substrates with heating or irradiating light to harden the sealing material to form the sealing-material portion and forming a portion of the spacers in the sealing-material portion and another portion to project from the sealing-material portion.

11. A method of manufacturing a flat display apparatus according to claim 10, wherein the sealing step is an air pressure sealing step.

12. A method of manufacturing a flat display apparatus according to claim 11, wherein the sealing step is performed such that the temperature of the first and second substrates is controlled at a temperature rising rate of 3° C./min or higher.

13. A flat display apparatus comprising:

a light modulation layer held between a pair of substrates disposed opposite to each other through columnar patterned spacers; and a sealing material applied in the form of a rectangular configuration along the outer periphery of the substrate, wherein at least either of the pair of substrates includes the spacers for maintaining a predetermined distance between the pair of the substrates in a region in which the sealing material is formed, and the spacers are disposed on two sides of a parting line formed along substantial centers in the widthwise direction of the region in which the sealing material is formed, and each of the spacers has a length in the widthwise direction of the region in which the sealing material is formed which is longer than a length of each spacer in a direction perpendicular to the widthwise direction.

14. A flat display apparatus according to claim 13, wherein each of the spacers has a streamline cross sectional shape when the spacer is cut with a plane which is in parallel with the substrate.

15. A flat display apparatus according to claim 13, wherein an driving circuit for operating the flat display apparatus is provided for either of the pair of the substrates, and the driving circuit is disposed in the region in which the sealing material is formed.

16. A flat display apparatus according to claim 13, wherein the spacers are zigzag disposed across the parting line.

* * * * *